United States Patent Office 3,737,492
Patented June 5, 1973

3,737,492
METHOD OF PREPARING A POROUS CATALYST-CONTAINING ALKALINE EARTH METAL ALUMINATE OR TITANATE BODY
Cornelius Marthinus Stander, Kempton Park, Transvaal, and David Owen Hughes, Boksburg, Transvaal, Republic of South Africa, assignors to African Explosives and Chemical Industries Limited, Johannesburg, Transvaal, Republic of South Africa
No Drawing. Filed Dec. 9, 1970, Ser. No. 96,579
Claims priority, application Republic of South Africa, Dec. 12, 1969, 69/8,637, 69/8,638, 69/8,639
Int. Cl. B29h 7/20
U.S. Cl. 264—43                                    7 Claims

ABSTRACT OF THE DISCLOSURE

Process for making supported catalysts as porous, shaped bodies comprising heating a constituent including at least one oxide of a metal or metals or at least one substance from which a metal or the oxide of a metal can be formed with at least one mixture of one or more first compounds and one or more second compounds to a first elevated temperature sufficient to produce a binding agent, comminuting the resulting material, shaping the material into bodies and heating the shaped bodies at a second elevated temperature for a period of time sufficient to complete the reactions between the first and second compounds and produce catalysts as shaped bodies of adequate mechanical strength to be self supporting.

---

The present invention relates to the manufacture of improved active metal and metal oxide catalysts. More particularly, it relates to the production of porous, shaped bodies of metal and metal oxide catalysts for use in industrial chemical processes.

It is known that carriers for catalysts may be made by sintering a mixture of lime (CaO) and alumina ($Al_2O_3$) at a high temperature (about 1600° C.). However, it has been found not practicable to prepare a catalyst by incorporating the active catalyst, or a precursor thereof in the carrier material prior to the sintering process as the activity of the catalyst was likely to be destroyed thereby. It is the practice therefore to form the carrier and thereafter to incorporate the active catalyst, or a precursor thereof, in the carrier by, for example, impregnation with a solution. A disadvantage encountered in using this method is that the amount of catalyst that can be incorporated in the carrier is limited by the capacity of the carrier to absorb the solution. It is also known that hydraulic cements may be used as or incorporated in carrier compositions to enable the active catalyst to be incorporated during the formation of the carrier at low temperatures. However, one of the requirements of a catalyst carrier is that it should have adequate strength and be self-supporting at the temperatures and loads to which it is subjected during use. The temperature range within which many important chemical reactions take place is about 600° to 900° C. The carriers comprising or containing hydraulic cements have been found to lose strength at about 600° C. and this is a serious disadvantage for which no convenient remedy is known.

It is known, further, that a suitable carrier for an active metal oxide (in particular, cobalt oxide i.e. $Co_3O_4$) is calcium aluminate, which is thermodynamically stable in the presence of cobalt oxide at a temperature of 1000° C. Active cobalt oxide catalysts can be prepared by impregnating porous aluminium oxide bodies with solutions of calcium and cobalt salts and then heating the impregnated bodies to convert the calcium salt to calcium aluminate and the cobalt salt to the active cobalt oxide. The catalytic activity of these catalyst bodies is low since free aluminium oxide is present in the bodies and the cobalt oxide content is only about 20 percent by weight.

Active cobalt oxide catalyst have also been prepared by thermal decomposition of mixtures of nitrates of cobalt, calcium and aluminium. These catalysts show a good activity but are in the form of a particulate material such as a powder, which is quite unsuitable for use in industrial processes.

It is an object of the present invention to provide active metal or metal oxide catalysts in the form of porous, shaped bodies having adequate mechanical strength and high activity for use in industrial process.

According to the present invention there is provided a process for making supported catalysts as porous, shaped bodies comprising heating a constituent including at least one oxide of a metal or metals or at least one substance from which a metal or the oxide of a metal can be formed with at least one mixture of one or more first compounds and one or more second compounds to a first elevated temperature sufficient to produce a binding agent, comminuting the resulting material, shaping the material into bodies and heating the shaped bodies at a second elevated temperature for a period of time sufficient to complete the reactions between the first and second compounds and to produce catalysts as porous, shaped bodies of adequate mechanical strength so as to be self supporting.

The oxides of metals and substances from which metals or oxides of metals can be formed may be combined to form the constituent. More than one metal or metal oxide may be present as the active catalyst in the shaped bodies of the invention.

The metal oxides which may be used in the process to form metal or metal oxide catalysts are the oxides of cobalt, nickel, copper, iron, vanadium, silver, platinum, iridium, osmium, palladium, rhodium thorium uranium, neodymium, praseodymium, manganese, molybdenum, tungsten, cerium, ruthenium, bismuth or antimony.

Substances which may be used as precursors of the metals or metal oxides are the nitrates of cobalt, nickel, copper, iron, silver, platinum, iridium, osmium, palladium, rhodium, thorium, uranium, neodymium praseodymium manganese, cerium, ruthenium, bismuth or antimony, the carbonates of cobalt, nickel, iron, silver, cerium, neodymium or praseodymium, the basic carbonates of cobalt, nickel, copper, iron, manganese or bismuth, the hydrated oxides of cobalt, nickel, copper, iron, vanadium, silver, platinum, iridium, osmium, palladium, rhodium, thorium, uranium, manganese, molybdenum, tungsten, cerium, ruthenium, bismuth or antimony, ammonium vanadate, ammonium uranyl carbonate, ammonium molybdate, ammonium tungstate, or ammonium ceric nitrate.

The first compound referred to in the above description of the process may be a nitrate, oxide or hydroxide of aluminium or the dioxide of titanium.

The second compound referred to in the above description of the process may be a nitrate of an alkaline earth metal, namely, calcium, barium, strontium or magnesium.

The preferred proportions of the oxide or hydroxide of aluminium or the dioxide of titanium and the nitrates of the alkaline earth metals are approximately stoichiometric, the quantities being chosen to ensure that the molar ratio of the oxide of aluminium or dioxide of titanium to the oxide of the alkaline earth metal in the product of the invention is about 1:1. A slight excess of the second compound in the product is permissible.

The ingredients selected from the chemicals referred to above are mixed and heated to an elevated temperature at which temperature the nitrate of aluminium is converted to hydrated aluminium oxide and the nitrates of the alkaline earth metals are obtained in substantially anhydrous form.

This temperature shall not exceed the temperature at which the nitrates of the alkaline earth metals react appreciably with the hydrated aluminum oxide or titanium dioxide which temperature is above about 500° C. The preferred temperature may be within the range 250° to 300° C.

The reactions taking place at the first elevated temperature may be represented as follows, the preparation of a cobalt oxide catalyst on a calcium aluminate carrier being used as an example.

$$3Co(NO_3)_2 \cdot 6H_2O \rightarrow Co_3O_4 + 6NO_2 + O_2 + 18H_2O$$

$$4Al(NO_3)_3 \cdot 9H_2O \rightarrow 2Al_2O_3 + 12NO_2 + 3O_2 + 36H_2O$$

$$Ca(NO_3)_2 \cdot 4H_2O \rightarrow Ca(NO_3)_2 + 4H_2O$$

The resulting material has a slightly sticky consistency caused by the presence of the substantially anhydrous alkaline earth metal nitrate which acts as a binder for the other ingredients of the material in the preparation of the shaped bodies form this material.

The preparation of the shaped bodies from the material may be done by means of commonly known methods and apparatus such as, for instance, pelleting, tabletting or extrusion.

The shaped bodies are then heated to a second elevated temperature, at which temperature the alkaline earth metal nitrate and aluminum oxide or titanium dioxide react to form the corresponding aluminates or titanates and typical reactions may be represented in the example referred to about as follows:

$$2Ca(NO_3)_2 \rightarrow 2CaO + 4NO + 3O_2$$

$$CaO + Al_2O_3 \rightarrow CaAl_2O_4$$

The temperature at which the shaped bodies are heated shall not exceed the temperature beyond which the catalytically active metal oxide is converted into an inactive oxide. The preferred temperature in this stage of the process may be within the range of from 680° to 750° C.

The strength of the shaped bodies may be enhanced by treatment of the comminuted material with water either prior to the preparation of the shaped bodies or after heating at the second elevated temperature. It may be desirable to heat the shaped bodies for a further period of time at the second elevated temperature.

If desired, the heating of the shaped bodies may be carried out in an inert atmosphere, such as as nitrogen or helium, in an oxidising atmosphere, such as oxygen, or in a reducing atmosphere, such as hydrogen. The preferred atmosphere for heating the shaped bodies is air. The temperature at which the shaped bodies are heated may fall outside the preferred temperature range of from 680° to 750° C. when the heating takes place in an atmosphere such as the inert, oxidising or reducing atmosphere referred to above.

The process as described above may be varied within the scope of the invention.

For example, the constituent selected from oxides of metals and precursors thereof may be added to the mixture of first and second compounds after the stage of heating this mixture to the first elevated temperature in which the binding agent is formed.

The constituent may be added before or after the comminuting stage.

In this case the metal or metal oxides present in the final catalyst may be obtained from precursors thereof which are converted in the second heating stage to the desired metals or metal oxides.

It may also be convenient to eliminate the first heating stage by used as starting material a mixture of aluminium oxide or hydrated alumina or titanium dioxide, a substantially anhydrous alkaline earth metal nitrate (the binding agent) and a constituent selected from metal oxides, precursors thereof and combinations of these compounds. This mixture is then shaped into bodies by commonly known methods and heated to a temperature within the same range as the second elevated temperature referred to in the preceding description.

The porous, shaped bodies obtained from the process of the invention have adequate mechanical strength for use as catalysts in industrial processes and consist of a mixture of active metal oxide and aluminates or titanates of the alkaline earth metals. If desired, the metal oxide may be reduced to metal by methods well known in the art, for instance, by reduction with hydrogen. This step may be carried out during the heating of the shaped bodies as described above or subsequently such as for instance, during the chemical process in which the catalyst is used.

EXAMPLE 1

A catalyst was prepared by heating a mixture comprising 145 grams of cobaltous nitrate $(Co(NO_3)_2 \cdot 6H_2O)$, 95 grams of aluminium nitrate $(Al(NO_3)_3 \cdot 9H_2O)$ and 29.9 grams of calcium nitrate $(Ca(NO_3)_2 \cdot 4H_2O)$ at a temperature of 297° C. until brown fumes of nitrogen dioxide ceased to evolve, which indicated that all nitrates of cobalt and aluminium had been converted to their respective oxides.

The resultant material was powdered and then compressed into pills having a diameter of 7.5 millimeters and a height of 7.5 millimeters using a laboratory tabletting machine. The pills were heated for one hour at a temperature of 727° C. in a muffle furnace to complete the formation of calcium aluminate from calcium nitrate and aluminium oxide.

The catalyst was screened for activity by passing a mixture of 10 percent ammonia in air with a space velocity of about 16,000 hr.$^{-1}$ over a bed of catalyst pills at a temperature of 650° C. The conversion efficiency to nitric oxide was found to be 91 percent.

EXAMPLE 2

A catalyst was prepared by heating a mixture comprising 155.7 g. nickel nitrate $(Ni(NO_3)_2 \cdot 6H_2O)$, 178.28 g. barium nitrate $(Ba(NO_3)_2)$ and 54.81 g. titanium dioxide $(TiO_2)$ at a temperature of 270° C. until brown fumes of nitrogen dioxide ceased to evolve.

The resultant material was crushed and passed through a 200 mesh British Standard Sieve. The powdered material was pressed into rings of 16.5 x 16.5 mm. external size. The rings was heated at 700° C. for 12 hours. The rings obtained were very strong.

EXAMPLE 3

A catalyst was prepared by heating a mixture comprising 333 g. ferric nitrate $(Fe(NO_3)_3 \cdot 9H_2O)$, 154 g. aluminium nitrate $(Al(NO_3)_3 \cdot 9H_2O)$ and 51 g. calcium nitrate $(Ca(NO_3)_2 \cdot 4H_2O)$ at a temperature of 275° C.

The resultant material was crushed and passed through a 100 mesh British Standard Sieve. The powdered material was moistened and extruded to form 5 x 5 mm. pellets. The pellets were heated at 70° C. for 8 hours, moistened by spraying with water and re-heated at 700° C. for ½ hour. The pellets obtained were strong.

EXAMPLE 4

Another cobalt oxide catalyst was prepared by heating a mixture comprising 241.8 g. cobaltous nitrate $$(Co(NO_3)_2 \cdot 6H_2O)$$

158.09 g. aluminium nitrate $(Al(NO_3)_3 \cdot 9H_2O)$ and 49.78 g. calcium nitrate $(Ca(NO_3)_2 \cdot 6H_2O)$ at a temperature of 270° C. for 12 hours. The resultant material crushed and passed through a 33 mesh British Standard Sieve. The powdered material was extruded into pellets 5 x 5 mm. The pellets were heated at 700° C. for 1 hour, sprayed with water and re-heated at 700° C. for ¼ hour. The pellets obtained were strong.

EXAMPLE 5

A catalyst was prepared containing praseodymium oxide. The quantities of the starting materials used were as follows, 20 g. praseodymium oxide ($Pr_6O_{11}$), 95 g. aluminium nitrate ($Al(NO_3)_3 \cdot 9H_2O$) and 30 g. calcium nitrate ($Ca(NO_3)_2 \cdot 4H_2O$).

The praseodymium oxide was dissolved in 30 ml. 55% nitric acid. The other compounds were added to the solution.

The solution was heated until nitrous fumes evolved and then kept at 270° C. for 2½ hours.

The resultant material was ground to a fine yellow-green powder.

The powdered material was moistened and extruded to form 5 x 5 mm. pellets. The pellets were slowly heated to 700° C., cooled, sprayed with water and re-heated at 700° C. for ½ hour.

The pellets obtained were strong.

EXAMPLE 6

A further nickel oxide catalyst was prepared by heating a mixture comprising 81.74 g. nickel nitrate $$Ni(NO_3)_2 \cdot 6H_2O$$

515.19 g. aluminium nitrate ($Al(NO_3)_3 \cdot 9H_2O$) and 37.90 g. calcium nitrate ($Ca(NO_3)_2 \cdot 4H_2O$) at a temperature of 270° for 24 hours.

The resultant material was crushed and passed through a 33 mesh British Standard Sieve.

The powdered material was extruded to form 5 x 5 mm. pellets.

The pellets were heated at 700° C. for 1 hour, sprayed with water and re-heated at 700° C. for ½ hour.

The pellets obtained were of satisfactory strength.

EXAMPLE 7

A cobalt oxide catalyst was prepared by heating a mixture comprising 241.84 g. cobaltous nitrate $$Co(NO_3)_2 \cdot 6H_2O$$

49.78 g. calcium nitrate ($Ca(NO_3)_2 \cdot 4H_2O$) and 32.88 g. hydrated alumina ($Al_2O_3 \cdot 3H_2O$) at a temperature of 270° C. for 20 hours. The resultant material was crushed and passed through a 33 mesh British Standard Sieve. The powdered material was extruded and formed into 5 x 5 mm. pellets.

The pellets were heated at 700° C. for 1 hour, sprayed with water and re-heated at 700° C. for ¼ hour.

The pellets obtained were strong.

EXAMPLE 8

Another cobalt oxide catalyst was prepared using the same procedure as described in Example 7. The following quantities and compounds were used: 278.7 g. cobaltous nitrate ($Co(NO_3)_3 \cdot 6H_2O$), 75.0 g. aluminium nitrate ($Al(NO_3)_3 \cdot 9H_2O$) and 26.1 g. barium nitrate $$Ba(NO_3)_2.$$

The pellets obtained were strong.

The shaped catalyst bodies of the invention may be used with great advantage in catalytic processes, for instance, the cobalt oxide catalyst exemplified above as replacement for such expensive catalysts as platinum gauze commonly used in the oxidation of ammonia. Because it is possible to produce catalyst bodies with a relatively high catalyst content, the catalyst bodies of the invention may also be used with advantage in processes where use of catalyst bodies of low catalyst content restrict the space velocity of the reactions, for instance, in hydrocarbon reforming processes. Their use is not, however, restricted to the applications mentioned.

Advantages residing in the process and the product of the invention are that (a) The catalyst bodies produced are porous.

(b) The porous, shaped bodies have high mechanical strength and resistance to thermal shock and do not lose strength at the temperatures encountered in catalytic reactions.

(c) The catalyst bodies are formed at low temperatures compared with those made by the sintering process and considerable saving in cost is achieved thereby.

We claim:

1. Process for making supported catalysts as porous shaped bodies consisting essentially of a catalytically active constituent and an alkaline earth metal aluminate or titanate consisting of making a mixture, in approximately stoichiometric amounts so that the molar ratio in the product is about 1:1, of an anhydrous alkaline earth metal nitrate, a compound selected from the group consisting of aluminium nitrate, aluminium oxide, aluminium hydroxide and titanium dioxide, and a catlytically active constituent selected from the group consisting of metals and their metal oxides wherein the metal is selected from the group consisting of cobalt, nickel, copper, iron, vanadium, silver, platinum, iridium, osmium, palladium, rhodium, thorium, uranium, neodymium, praseodymium, manganese, molybdenum, tungsten, cerium, ruthenium, bismuth and antimony, compounds which will yield catalytically active metals and catalytically active metal oxides on heating selected from the group consisting of the nitrates of cobalt, nickel, copper, iron, silver, platinum, iridium, osmium, palladium, rhodium, thorium, uranium, neodymium, praseodymium, manganese, cerium, ruthenium, bismuth and antimony, the carbonates of cobalt, nickel, iron, silver, cerium, neodymium and praseodymium, the basic carbonates of cobalt, nickel, copper, iron, manganese and bismuth, the hydrated oxides of cobalt, nickel, copper, iron, vanadium, silver, platinum, iridium, osmium, palladium, rhodium, thorium, uranium, manganese, molybdenum, tungsten, cerium, ruthenium, bismuth and antimony, ammonium vanadate, ammonium uranyl carbonate, ammonium molybdate, ammonium tungstate and ammonium ceric nitrate and combinations thereof; comminuting said mixture to particles so as to pass a 65 mesh British Standard Sieve and shaping the mixture into bodies wherein the anhydrous alkaline earth metal nitrate acts as a binder for said bodies; heating the shaped bodies to a temperature within the range of from 650° to 950° C. for a period of time sufficient to complete the formation of alkaline earth metal aluminate or titanate from the anhydrous alkaline earth metal nitrate and the compound selected from aluminium nitrate, aluminium oxide, aluminium hydroxide and titanium dioxide in the mixture, the proportions of anhydrous nitrate, the compound and the constituent being such as to give stable, porous, shaped bodies which do not contain free aluminium oxide or titanium dioxide and which consist essentially of catalytically active metals or metal oxides and alkaline earth metal aluminate or titanate, the aluminate or titanate comprising 5 to 50 percent by weight of the bodies.

2. A process as claimed in claim 1 in which the mixture is made from a composition containing a hydrated alkaline earth metal nitrate, a compound selected from the group consisting of aluminium nitrate, aluminium hydroxide, the hydrates thereof and titanium dioxide, and said compounds which will yield catalytically active metals and catalytically active metal oxides on heating, by heating the composition at a temperature within the range of from 200° to 560° C. for a period of time sufficient to form anhydrous alkaline earth metal nitrate which acts as a binding agent for the resulting mixture.

3. A process as claimed in claim 1 in which the mixture is made from a composition containing a hydrated alkaline earth metal nitrate, a compound selected from the group consisting of aluminium nitrate, aluminium hydroxide, the hydrates thereof and titanium dioxide, by heating the composition at a temperature within the range of from 200° to 560° C. for a period of time sufficient to form anhydrous alkaline earth metal nitrate which acts as a binding agent for the resulting material, and comminuting the material before or after adding the catalytically active constituent and shaping the resulting mixture into bodies.

4. Process as claimed in claim 1 in which the temperature is between 680° and 750° C.

5. A process as claimed in claim 1 in which the alkaline earth metal is selected from the group consisting of calcium, barium, strontium and magnesium.

6. Process as claimed in claim 2 in which the first elevated temperature is between 250° and 350° C.

7. Process as in claim 3 in which the first elevated temperature is between 250° C. and 350° C.

References Cited

UNITED STATES PATENTS

| Number | Date | Name | Class |
|---|---|---|---|
| 3,387,038 | 6/1968 | Koch | 252—438 X |
| 2,523,686 | 9/1950 | Engel | 252—438 X |
| 3,163,612 | 12/1964 | Meisinger et al. | 252—438 |
| 3,288,722 | 11/1966 | Gleim | 252—438 |
| 3,294,707 | 12/1966 | Pollitzer et al. | 252—438 |
| 3,148,157 | 9/1964 | Pollitzer et al. | 252—438 |
| 2,517,223 | 8/1950 | Mantell | 252—438 |
| 2,486,361 | 10/1949 | Nahin et al. | |
| 2,377,025 | 5/1945 | Miller | 252—438 X |
| 2,927,903 | 3/1960 | Nixon | 252—438 X |
| 3,397,154 | 8/1968 | Talsma | 252—463 |
| 3,141,729 | 7/1964 | Clark et al. | 252—475 X |
| 2,921,033 | 1/1960 | Houdry | 252—475 X |
| 3,444,256 | 5/1969 | Engelhard et al. | 252—463 X |
| 3,444,257 | 5/1969 | Engelhard et al. | 252—463 X |
| 2,763,696 | 9/1956 | Finch et al. | 252—475 X |
| 3,173,883 | 3/1965 | Cornelius et al. | 252—463 X |
| 3,436,358 | 4/1969 | Thygesen | 252—463 X |

JOSEPH L. SCHOFER, Primary Examiner

D. A. JACKSON, Assistant Examiner

U.S. Cl. X.R.

252—463, 475; 264—60, 65, 66